(12) United States Patent
Shapiro et al.

(10) Patent No.: US 12,181,353 B2
(45) Date of Patent: Dec. 31, 2024

(54) WELDABLE STRAIN SENSOR ASSEMBLY

(71) Applicant: Strain Measurement Devices, Inc., Wallingford, CT (US)

(72) Inventors: Daniel Shapiro, Branford, CT (US); Neal Justin Wostbrock, North Haven, CT (US); William Easlea, Suffolk (GB); Eduard Krutyanskiy, Middlebury, CT (US); Chris Bowman, Suffolk (GB)

(73) Assignee: STRAIN MEASUREMENT DEVICES, INC., Wallingford, CT (US)

( * ) Notice: Subject to any disclaimer, the term of this patent is extended or adjusted under 35 U.S.C. 154(b) by 299 days.

(21) Appl. No.: 17/896,680

(22) Filed: Aug. 26, 2022

(65) Prior Publication Data

US 2023/0082460 A1 Mar. 16, 2023

Related U.S. Application Data

(60) Provisional application No. 63/234,933, filed on Aug. 19, 2021.

(51) Int. Cl.
 *G01L 1/22* (2006.01)
(52) U.S. Cl.
 CPC .......... *G01L 1/2287* (2013.01); *G01L 1/2262* (2013.01)

(58) Field of Classification Search
 CPC .................... G01L 1/2287; G01L 1/2262
 See application file for complete search history.

(56) References Cited

U.S. PATENT DOCUMENTS

| | | | | |
|---|---|---|---|---|
| 2007/0227255 A1* | 10/2007 | Goldfine | ............ | G01N 27/023 73/779 |
| 2007/0277621 A1* | 12/2007 | Schlachter | ........... | G01G 3/1412 73/774 |
| 2015/0369678 A1* | 12/2015 | Yoshida | ................ | G01L 1/165 29/25.35 |
| 2020/0003635 A1* | 1/2020 | Hirano | ................ | H01L 23/5383 |
| 2020/0249104 A1* | 8/2020 | Murakami | .......... | G01M 5/0058 |

* cited by examiner

*Primary Examiner* — Francis C Gray
(74) *Attorney, Agent, or Firm* — CANTOR COLBURN LLP

(57) ABSTRACT

A weldable strain sensor assembly configured to be joined to an instrumented component includes: a stand-off; a substrate disposed on top of the stand-off; and a sensing component disposed on a top or a bottom of the substrate; wherein the combination of the stand-off and the substrate are configured to suspend the sensing component over the instrumented component with a defined gap between the instrumented component and at least one of: the substrate; and, the sensing component.

27 Claims, 14 Drawing Sheets

WELDABLE STRAIN SENSOR ASSEMBLY

CROSS REFERENCE TO RELATED APPLICATIONS

This application claims the benefit of U.S. Provisional Application Ser. No. 63/234,933, filed Aug. 19, 2021, which is incorporated herein by reference in its entirety.

BACKGROUND

The present disclosure relates generally to a strain sensor assembly, and particularly to a weldable strain sensor assembly.

Thin film strain sensors require processing in vacuum chambers. These chambers are a fixed volume and therefore these sensors must be batch processed, as compared to continuous processing. Batch processing requires that each batch of sensors be loaded into the vacuum chamber and then processed over the course of 4-16 hours. When the load sensors are large or complex, the number of sensors that can be processed in any given batch is reduced.

While existing thin film strain sensors may be suitable for their intended purpose, the art of thin film strain sensors, particularly weldable thin film strain sensors, would be advanced by a thin film strain sensor assembly structured and configured in a manner that enables a way to increase the throughput in the thin film batch vacuum process.

BRIEF SUMMARY

An embodiment includes a weldable strain sensor assembly as defined by the appended independent claim. Further advantageous modifications of the weldable strain sensor assembly are defined by the appended dependent claims.

In an embodiment, a weldable strain sensor assembly configured to be joined to an instrumented component includes: a stand-off; a substrate disposed on top of the stand-off; and a sensing component disposed on a top or a bottom of the substrate; wherein the combination of the stand-off and the substrate are configured to suspend the sensing component over the instrumented component with a defined gap between the instrumented component and at least one of: the substrate; and, the sensing component. The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are to be numbered alike in the accompanying Figures.

Figure 1A:
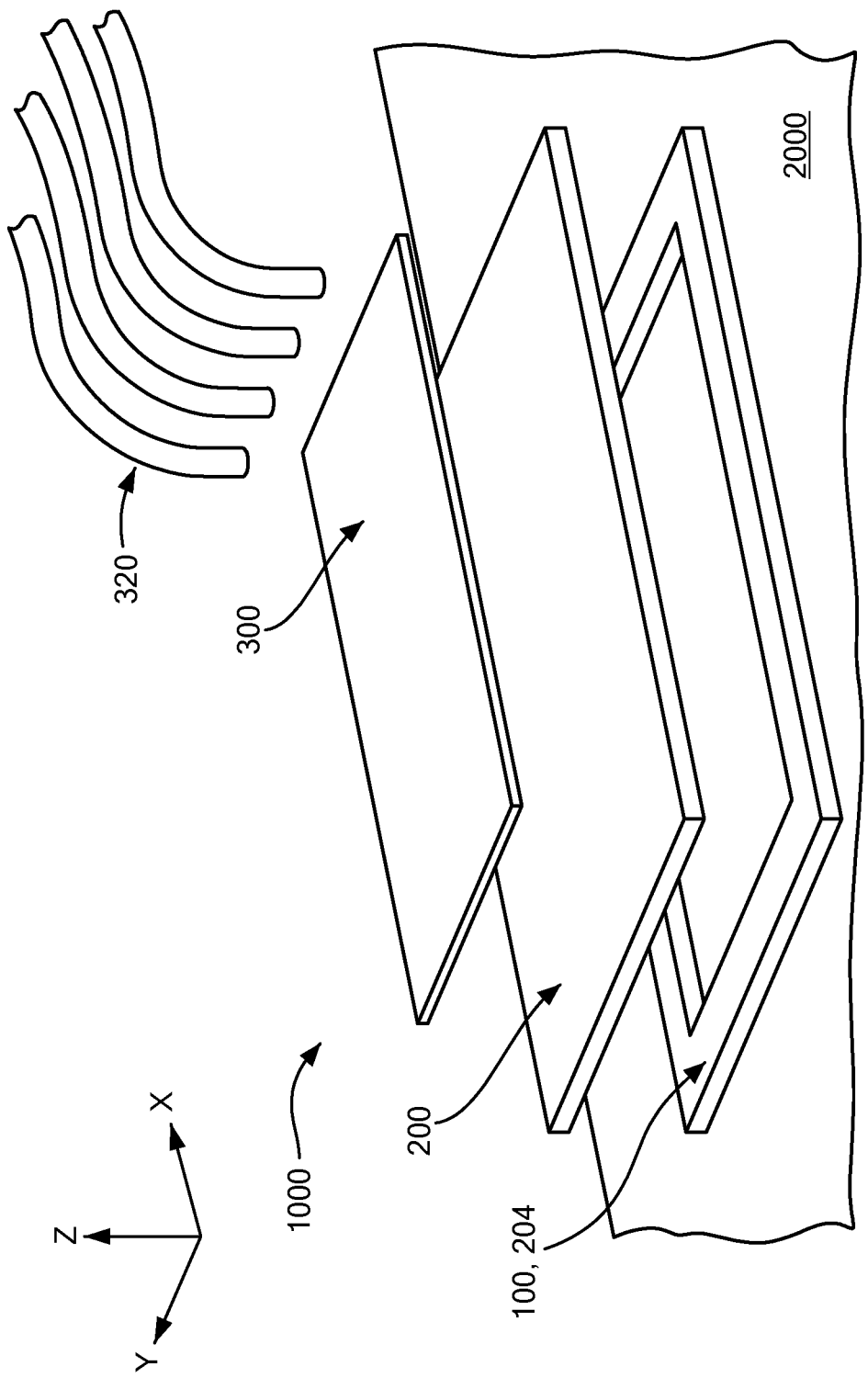
FIG. 1A depicts a rotated isometric view of a disassembled weldable strain sensor assembly, in accordance with an embodiment.

One skilled in the art will understand that the drawings, further described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures where it will be appreciated and understood that such enumeration where absent is inherently disclosed.

DETAILED DESCRIPTION

As used herein, the phrase "embodiment" means "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

An embodiment, as shown and described by the various figures and accompanying text, describes a solution where the sensing portion of an overall strain sensor structure is a small component that can be subsequently welded to a larger assembly or component to complete the load sensing assembly. This configuration allows for higher throughput in the batch processing, thereby increasing manufacturing efficiency. In addition, an embodiment disclosed herein may be used for assemblies that are difficult to gauge by conventional means.

A problem with building the sensing portion as a separate structure that can be subsequently attached to a larger assembly, is that the attachment method can affect the measurement accuracy. Because these types of strain sensors are so sensitive, their performance is influenced by different types of mounting configurations. Many types of mounting assemblies including fasteners, adhesives, and spot welding, can lead to non-linearity, hysteresis, non-repeatability, output instability, creep, performance changes with environmental conditions (e.g., temperature, humidity, chemical exposure, vibration, shock loading), and offset drift. Reduction in these performance metrics can lead to a sensor that has limited utility because of reduced accuracy. Such performance changes may in-part be due to friction at the interface of the connection between the sensor and the instrumented component, or due to changes (expansion, contraction, hydration, oxidation, delamination, viscoelastic creep, etc.) in the adhesives or epoxies used to attach the sensor to the frame.

What is needed is a sensor component and a method of attaching the sensor component to a load assembly without causing undue performance degradation of the sensor component, which is the subject of the disclosure herein, a weldable strain sensor assembly that can be attached to a larger load structure in a manner that does not significantly degrade the performance of the sensing component.

Figure 1B:
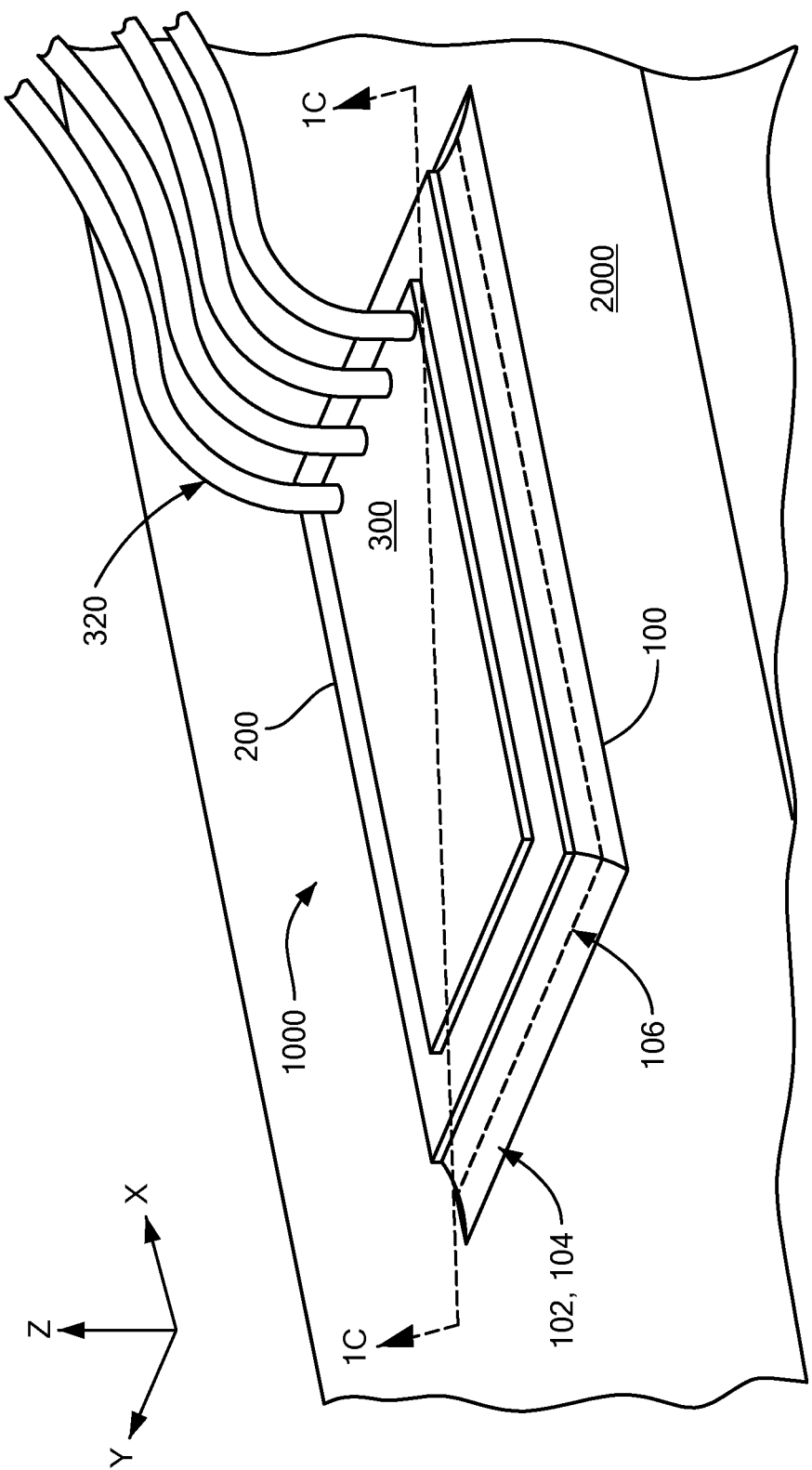
FIG. 1B depicts a rotated isometric view of the weldable strain sensor assembly of FIG. 1A assembled and welded to an instrumented component, in accordance with an embodiment.
Figure 1C:
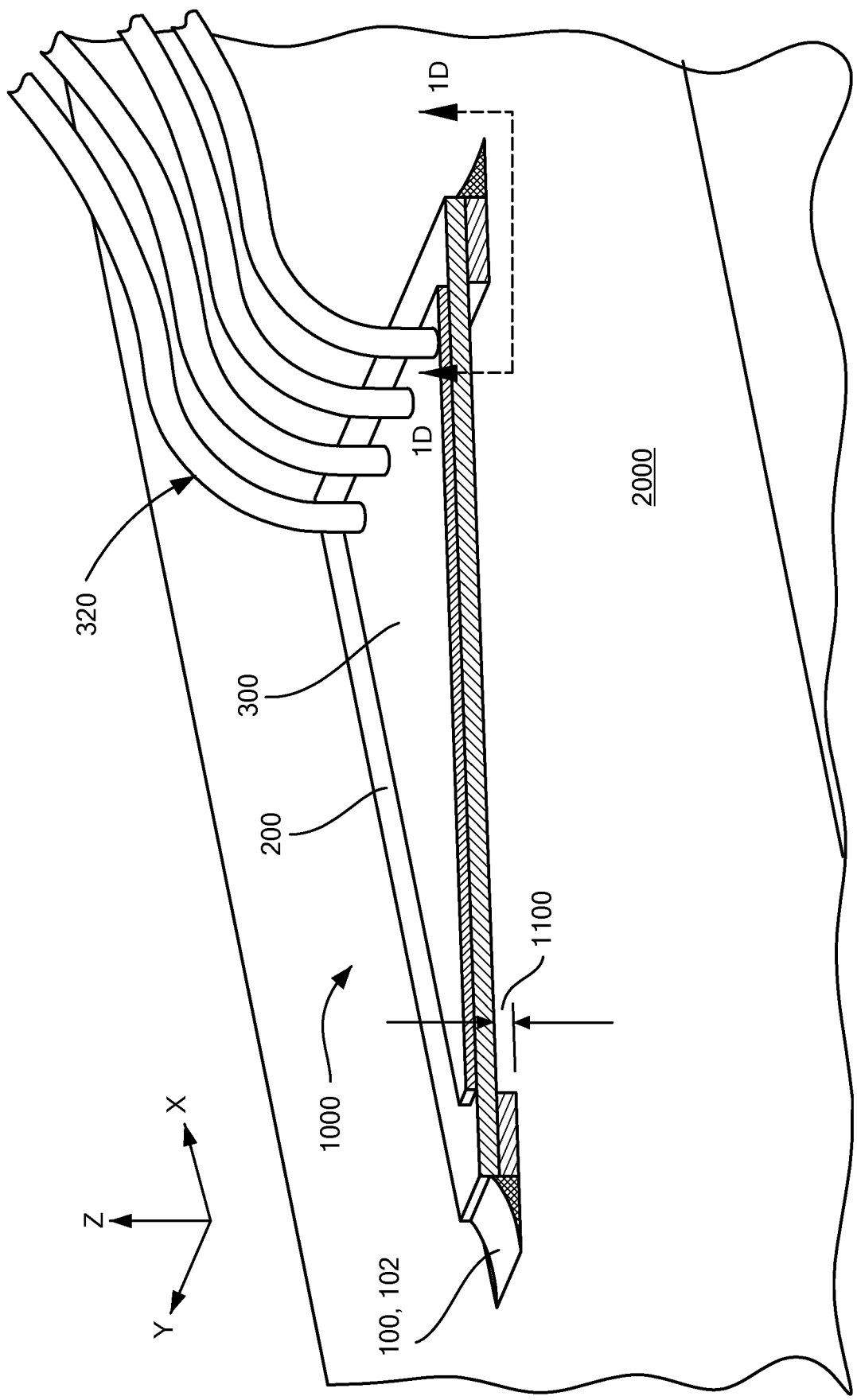
FIG. 1C depicts a rotated isometric view of a cross-section of the weldable strain sensor assembly of FIG. 1B, in accordance with an embodiment.
Figure 1D:
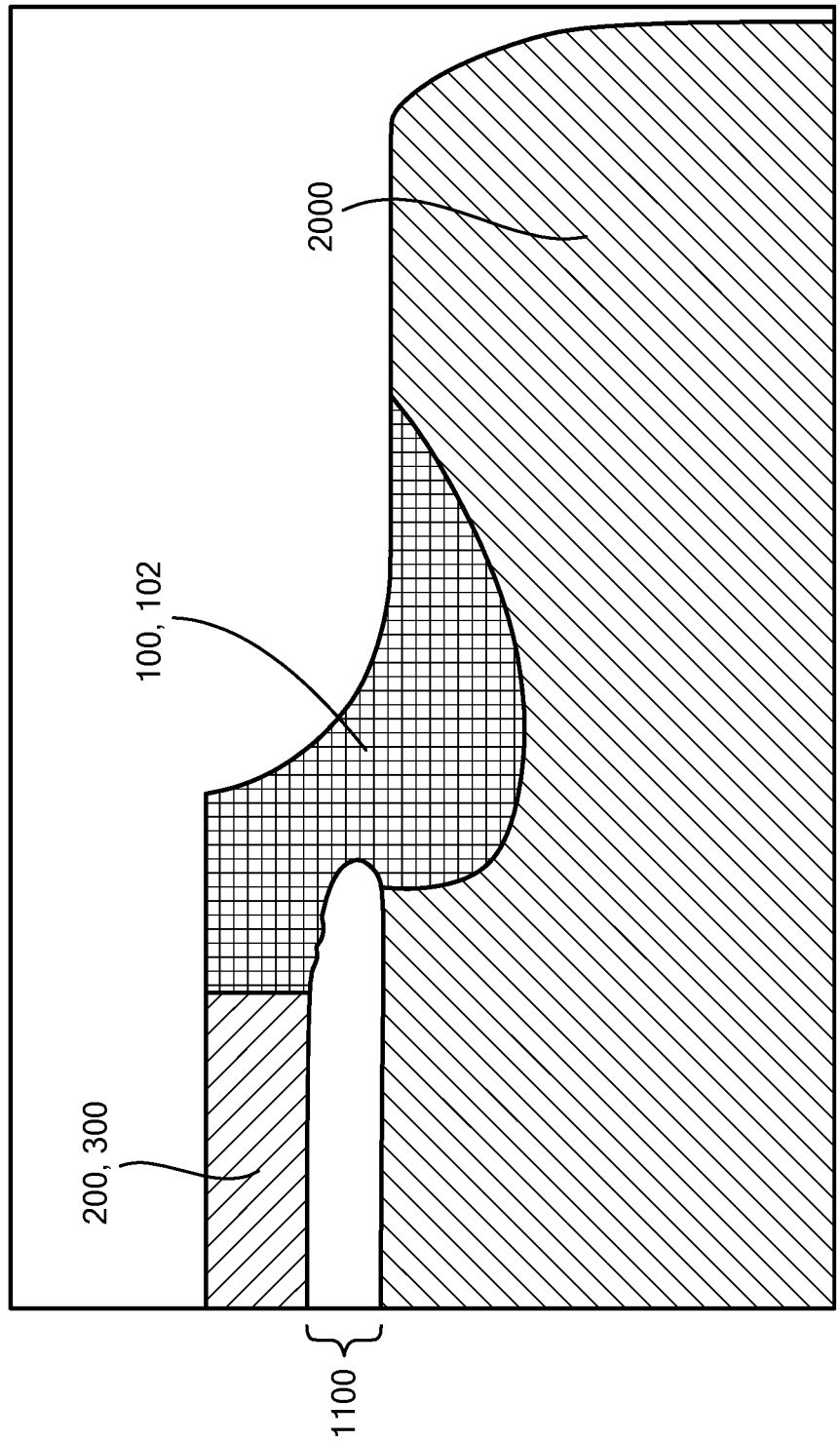
FIG. 1D depicts example detail features of a sectioned weld, Sect. 1D-1D, of the weldable strain sensor assembly of FIG. 1C, depicting full penetration of an overarching strain sensor assembly on an underlayering instrumented component, in accordance with an embodiment.

In an embodiment and with reference to FIGS. 1A-1E for example, the weldable strain sensor assembly 1000 is configured to be joined to an instrumented component 2000 and includes three main parts: a stand-off 100, a substrate 200 disposed on top of the stand-off 100, and a sensing component 300 disposed on a top or a bottom of the substrate 200. The assembly 1000 is configured to be joined to an instrumented component 2000, wherein the combination of the stand-off 100 and the substrate 200 are configured to suspend the sensing component 300 over the instrumented component 2000 with a defined gap 1100 between the instrumented component 2000 and the substrate 200 and/or the sensing component 300. This assembly 1000 and the instrumented component 2000 are depicted in the disassembled assembly view of FIG. 1A, the assembled view of FIG. 1B, and the assembled cross-section view of FIG. 1C with the defined gap 1100 depicted. FIG. 1D depicts example detail features of a sectioned weld, Sect. 1D-1D, of the weldable strain sensor assembly of FIG. 1C, depicting full penetration of an overarching sensing component 300 on an underlayering instrumented component 2000, with a stand-off 100 therebetween that serves to maintain the desired cavity or gap 1100 between the instrumented component 2000 and the sensing component 300. In an embodiment and as depicted in at least FIGS. 1B and 1C, the sensing component 300 has smaller x-y plan view dimensions than the substrate 200.

In an embodiment, the substrate 200 provides a surface for attaching the sensing component 300 to the substrate 200, and may also provide a surface to weld the sensor assembly 1000 to the instrumented component 2000. In an embodiment, the stand-off 100 suspends the substrate 200 to reduce contact friction between the sensing component 300 and the instrumented component 2000, where the stand-off 100 can be part of the substrate 200, can be a separate component, or can be a depression or recess 2200 (see FIG. 4F for example) in the instrumented component 2000. In an embodiment, the stand-off 100 provides a surface to weld 102 the sensor assembly 1000 to the instrumented component 2000. In an embodiment, the sensing component 300 contains sensor circuitry, protective coatings, adhesives, laminates, microcircuitry, and interconnect features, all of which are known in the art and therefore require no detailed description herein for one skilled in the art. An example of such a sensing component is described in U.S. Pat. No. 10,359,325 assigned to Strain Measurement Devices Inc., which is incorporated herein by reference in its entirety. In an embodiment, the instrumented component 2000 is a component that interfaces with a test assembly that generates strain to be measured. This test assembly can be a structural component in various instruments, tools, infrastructure, load cells, axles, pressure fittings, etc.

Each of the three main parts of the sensor assembly 1000, along with an instrumented component 2000, are depicted in FIG. 1A. A description of each part that was used to prototype an embodiment, along with alternative structures and components, is provided as follows with reference to the several figures provided herewith.

Stand-Off

An example stand-off 100 (see FIGS. 1A-1E, 2, and 3C, for example) was produced by etching a cavity or defined gap or cavity 1100 (best seen with reference to FIGS. 1C, 1D, and 3C) in the backside of the substrate 200. An original prototype substrate thickness was 0.012 inches, and the etched cavity was 0.006 inches deep. This left a 0.012 in thick rim or partial rim 204 (best seen with reference to FIGS. 1A and 2) with a 0.006 inch thick suspended surface, and a 0.006 inch cavity 1100 in the backside of the substrate 200. In an embodiment, the cavity or defined gap 1100 is equal to or greater than 0.0001 inches and equal to or less than 0.25 inches, alternatively is equal to or greater than 0.003 inches and equal to or less than 0.009 inches, or further alternatively is equal to about 0.006 inches. The cavity 1100 is provided to eliminate friction between instrumented component 2000, and the substrate 200 and/or sensing component 300. Friction in this region can lead to measurement errors. The stand-off 100 and/or cavity 1100 can be formed in the substrate 200, as a separate component, or as a feature in the instrumented component 2000.

Figure 4A:
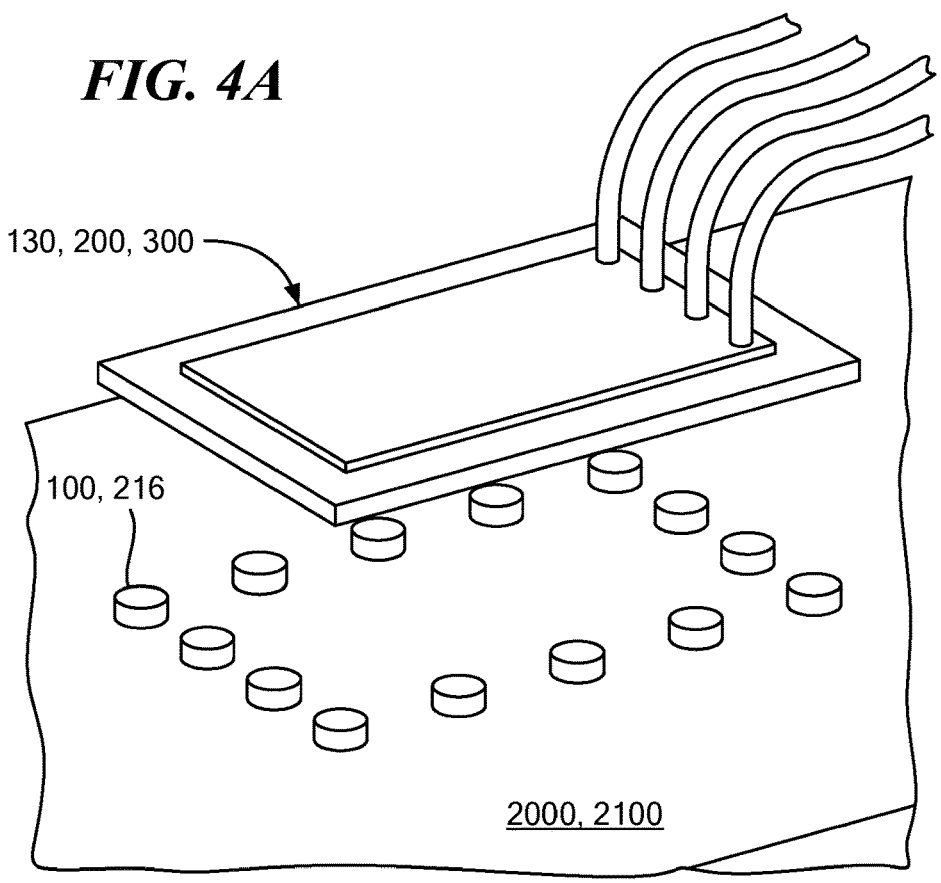
FIGS. 4A, 4B, 4C, 4D, 4E, and 4F, depict partially disassembled rotated isometric views of various example alternative stand-off configurations with respect to the substrate and sensing components, in accordance with an embodiment.
Figure 4B:
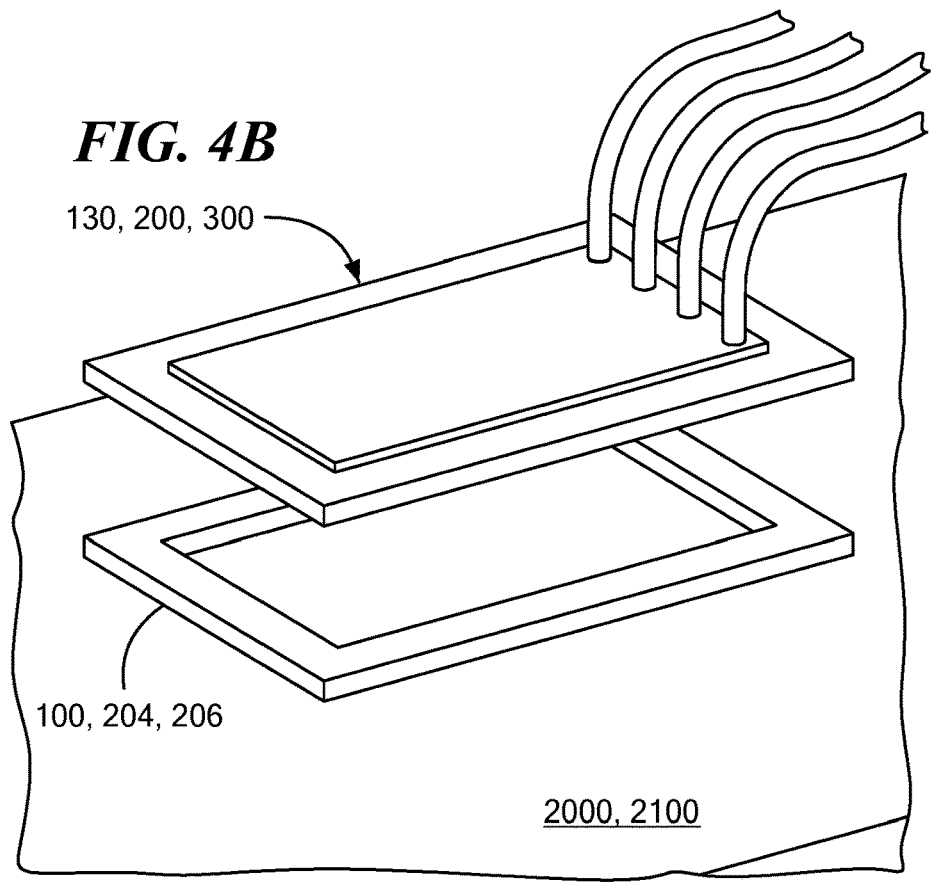
Figure 4C:
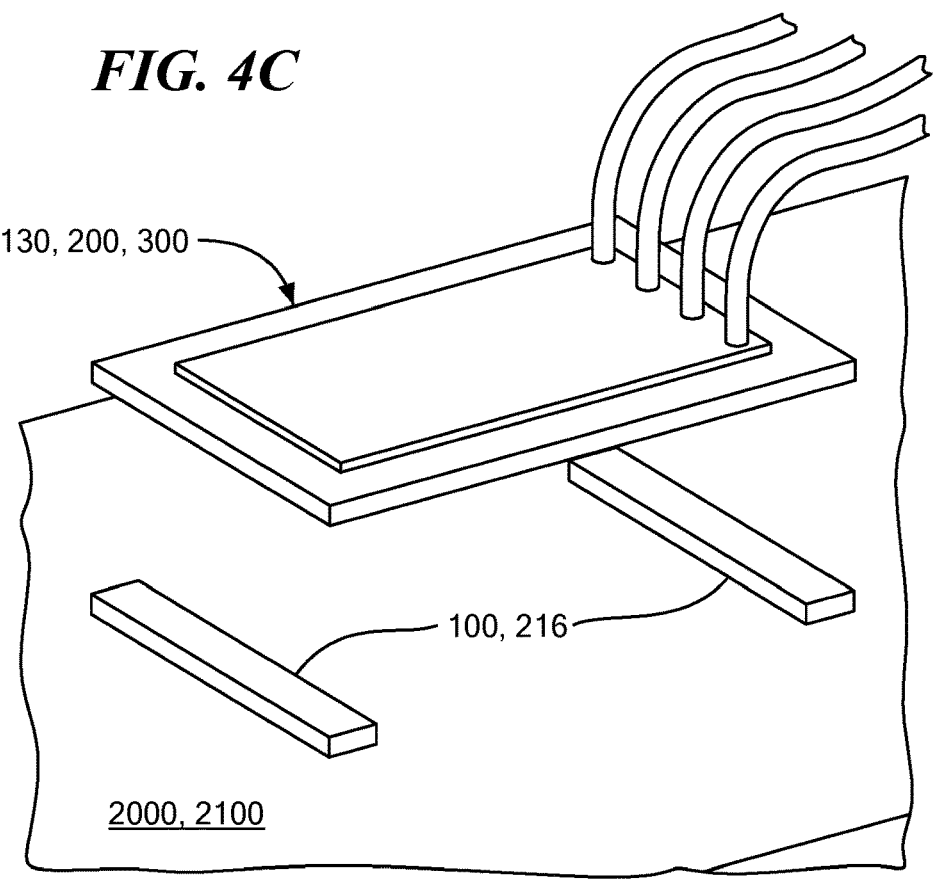
Figure 4D:
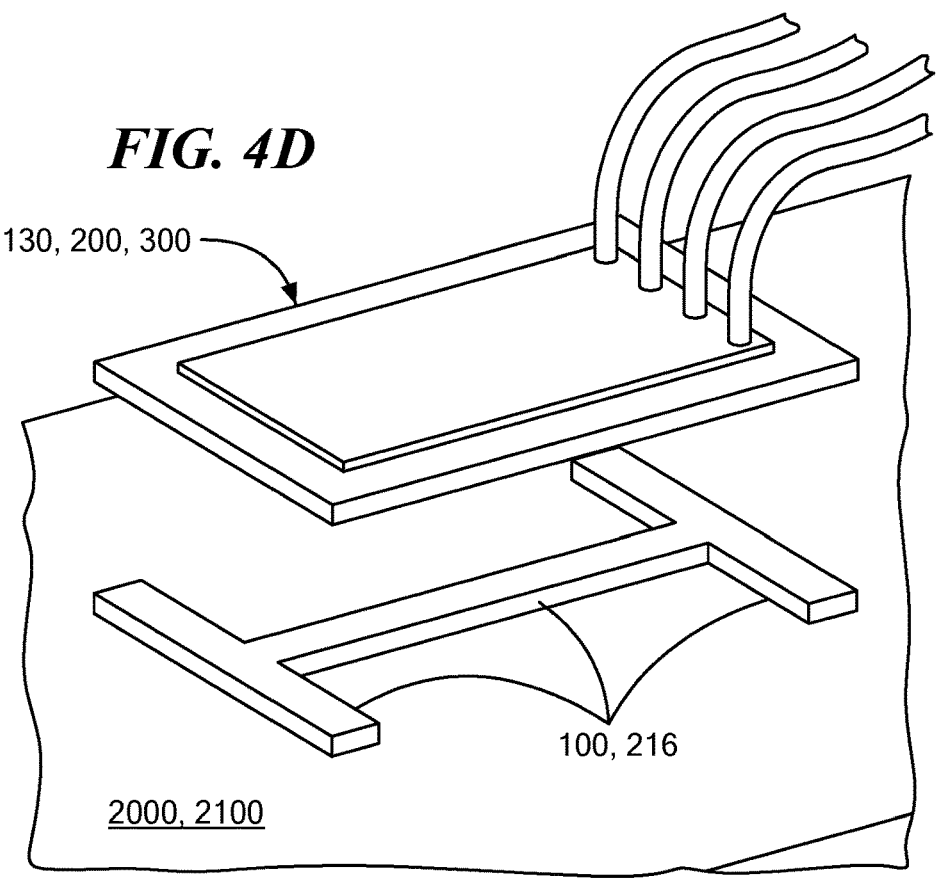
Figure 4E:
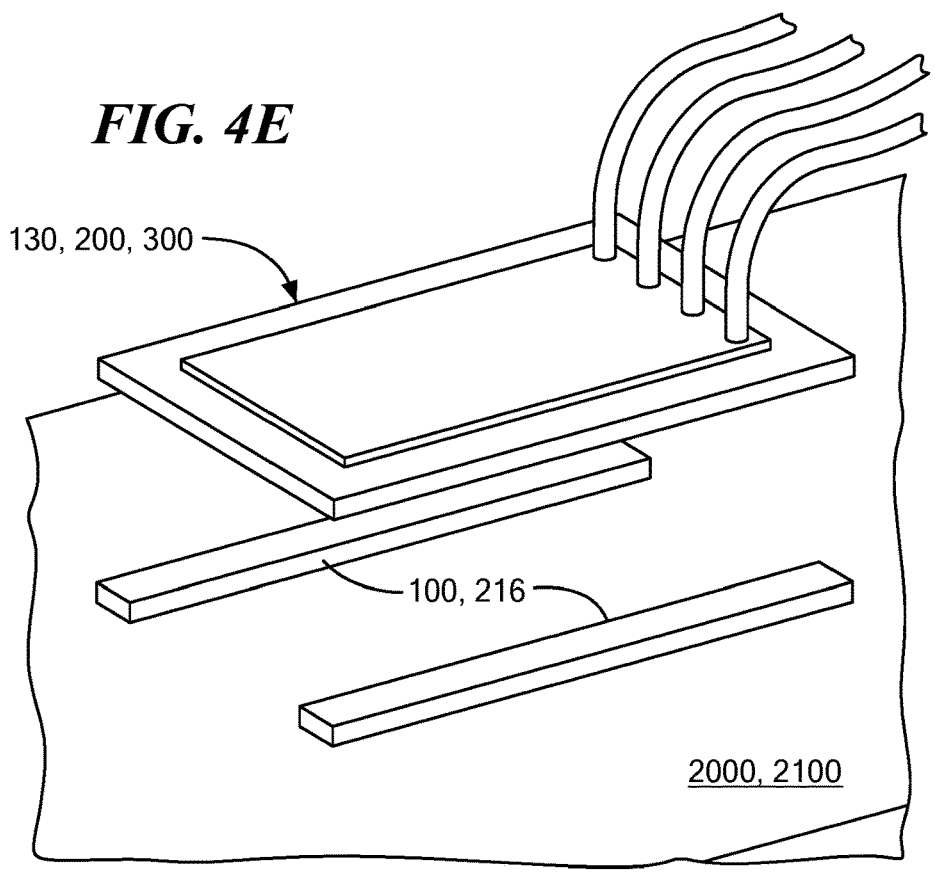
Figure 4F:
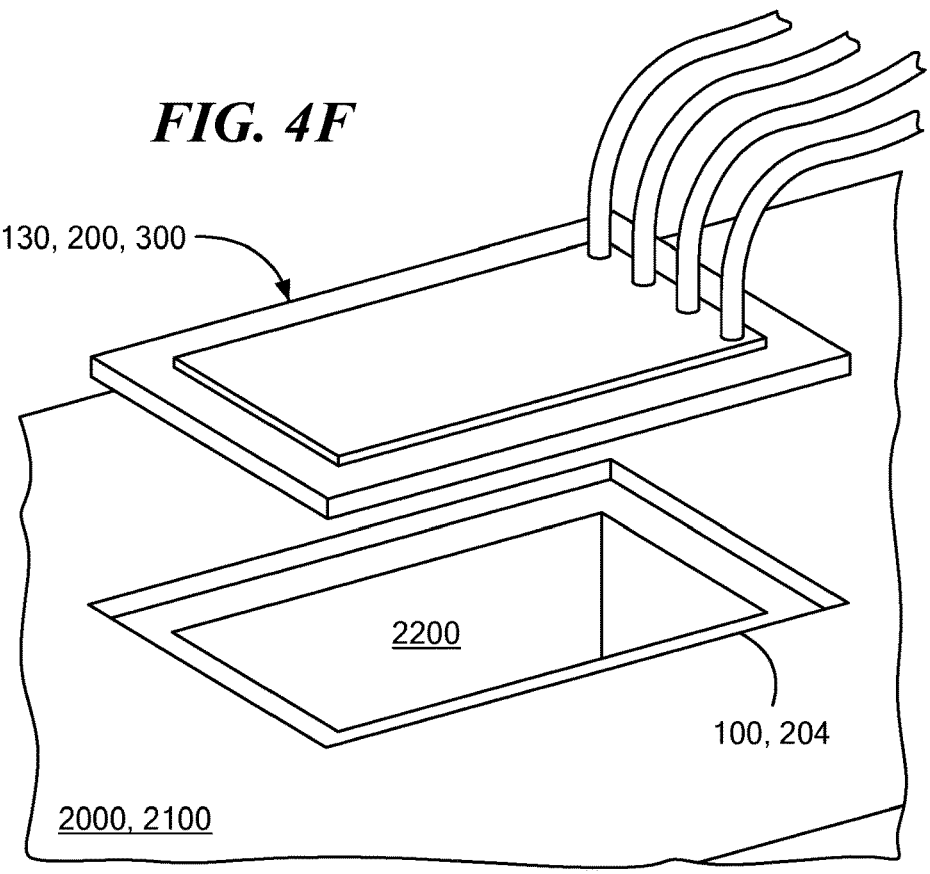

Alternative example stand-offs 100 are depicted in FIGS. 4A-4F, where: FIG. 4A depicts an example stand-off 100 provided by a plurality of spaced-apart projections 216 that extend upward from an upper support surface 2100 of the instrumented component 2000, or downward from an underside 208 of and are around an outer perimeter 210 of the substrate 200 (see also FIG. 2 for example); FIG. 4B depicts an example stand-off 100 in the form of a continuous uninterrupted projection 206 that extends upward from an upper support surface 2100 of the instrumented component 2000, or downward from an underside 208 (see FIG. 2 for example) of and is around an outer perimeter 210 of the substrate 200; FIG. 4C-4E depict alternative example stand-offs 100 that include two or more projections 216 that extend upward from an upper support surface 2100 of the instrumented component 2000, or downward from an underside 208 (see FIG. 2 for example) of and provide distributed support of the substrate 200 and sensing component 300 relative to the instrumented component 2000; and, FIG. 4F depicts an example stand-off 100 that includes an outer rim 204 at an upper support surface 2100 of the instrumented component 2000, or an underside 208 (see FIG. 2 for example) of the substrate 200 that cooperates with the upper support surface 2100 of the instrumented component 2000, and that surrounds a central recess 2200 in the instrumented component 2000.

In other example embodiments: the stand-off 100 is configured to be fixedly joined 102, or at least edge bonded 102, or welded 102, to the underlying instrumented component 2000 (see FIG. 1B for example). In an embodiment, the weld is a continuous weld 104 (see FIG. 1B for example), or an intermittent weld 106 (represented by dashed lines in FIG. 1B for example).

In an embodiment, the stand-off 100 is integrally formed with the substrate 200 to form a monolithic construct 130 (see FIGS. 4A-4F for example).

In an embodiment, the defined gap 1100 (see FIGS. 1C and 1D for example) between the instrumented component 2000 and the substrate 200 is formed by a recess 202 in the substrate 200 (see FIG. 1C for example), and a peripheral underside rim 204 of the substrate 200 (see FIGS. 2 and 4B for example) forms the stand-off 100.

Figure 5A:
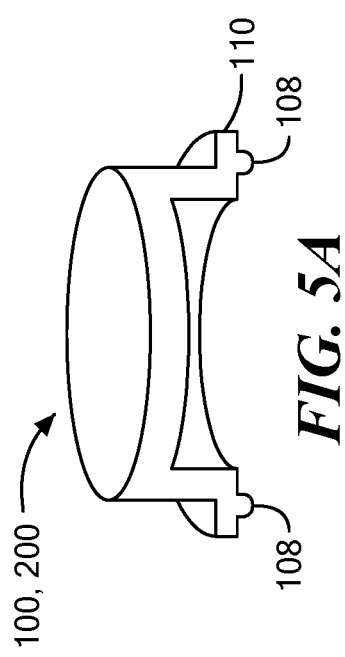
FIGS. 5A, 5B, 5C, 5D, 5E, 5F, and 5G, depict various example embodiments of a stand-off with a sacrificial skirt disposed on a bottom surface of the stand-off, in accordance with an embodiment.
Figure 5B:
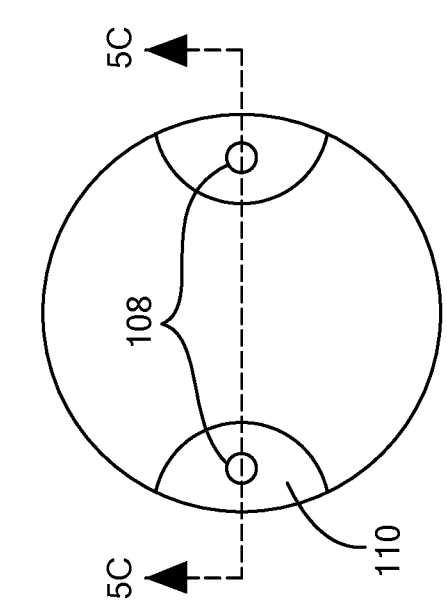
Figure 5C:
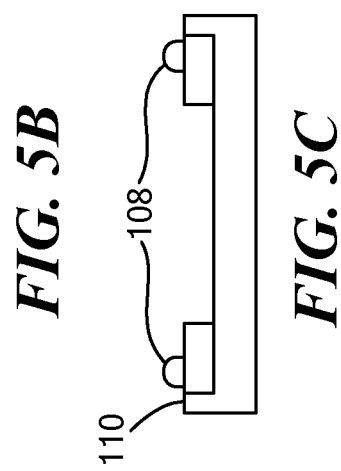
Figure 5D:
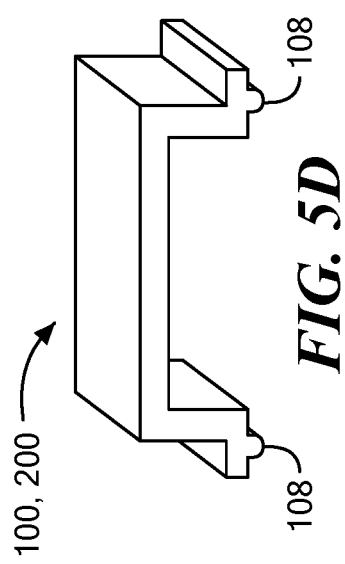
Figure 5E:
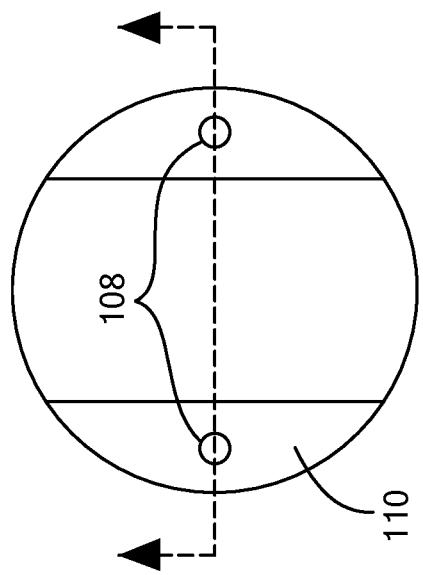
Figure 5F:
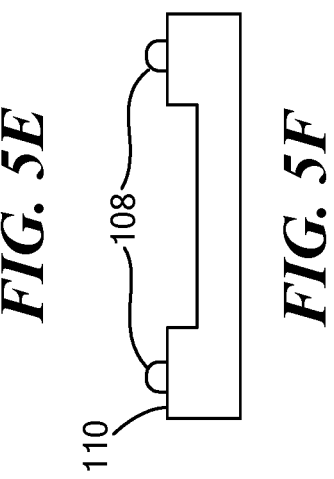
Figure 5G:
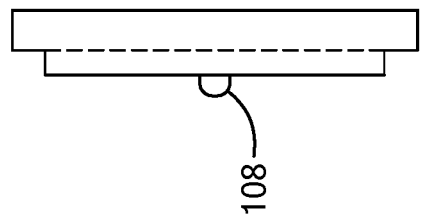

Reference is now made to FIGS. 5A-5G, where: FIG. 5A depicts a partial rotated isometric view of a stand-off 100 having a sacrificial skirt 108; FIG. 5B depicts a bottom-up plan view of the stand-off 100 of FIG. 5A; FIG. 5C depicts a cross-section end view of section cut 5C-5C in FIG. 5B; FIG. 5D depicts a partial rotated isometric view of another stand-off 100 alternative to that of FIG. 5A having a sacrificial skirt 108; FIG. 5E depicts a bottom-up plan view of the stand-off 100 of FIG. 5D; FIG. 5F depicts cross section end view of section cut 5F-5F in FIG. 5E; and, FIG. 5G depicts a side view of the stand-off 100 of FIG. 5E. As depicted in FIGS. 5A-5G, the stand-off 100, separately or in combination with the substrate 200, may include a sacrificial skirt 108 disposed on a bottom surface 110 of the stand-off 100, such that when the weldable strain sensor assembly 1000 is welded 102 (see FIGS. 1B, 1C, 1D, for example) to the instrumented component 2000, the sacrificial skirt 108 is first disposed in direct contact with the instrumented component 2000 and is then consumed or embedded, post-welding, into surrounding material of the stand-off 100 or the instrumented component 2000. In an embodiment, the sacrificial skirt 108 (see dashed line in FIG. 2 for example) is disposed proximate an outer perimeter 112 (best seen by reference to FIG. 2) of the stand-off 100 In an embodiment, the sacrificial skirt 108 is integrally formed with the stand-off 100. In an embodiment, the sacrificial skirt 108 comprises a plurality of sacrificial nibs 114.

Substrate

Figure 2:
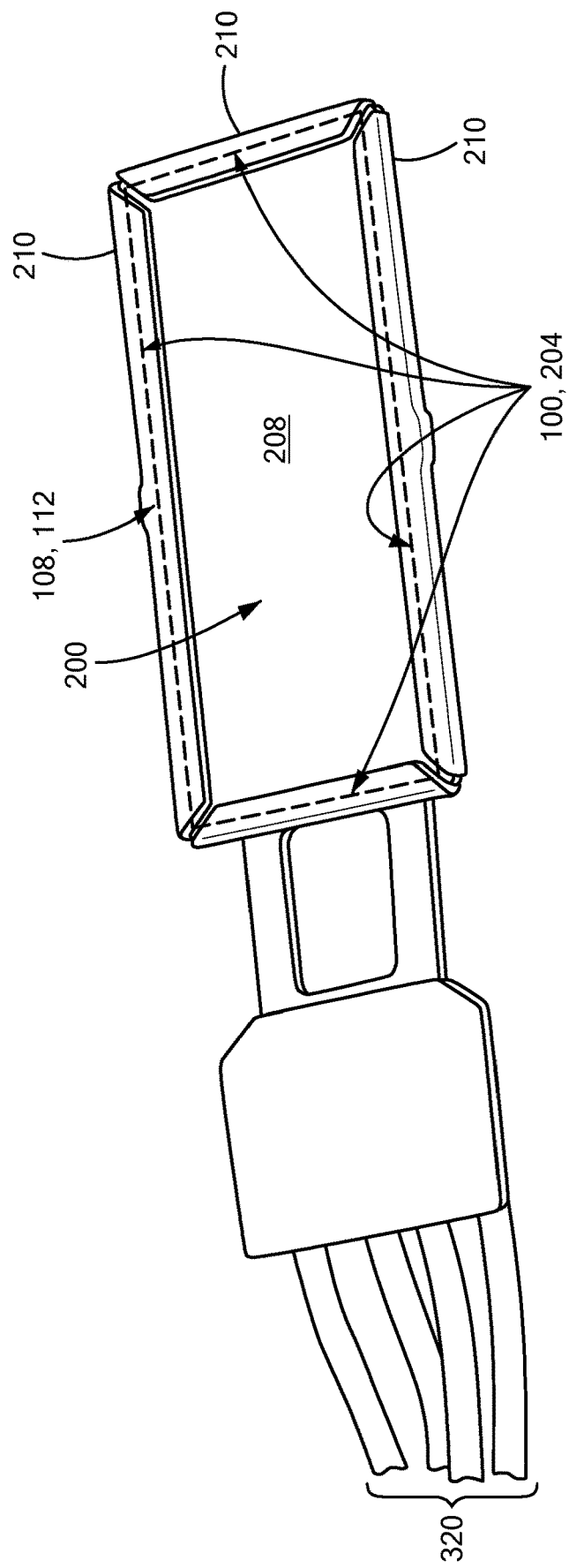
FIG. 2 depicts a bottom-up plan view of example stand-off and substrate components, in accordance with an embodiment.

Example substrates 200 (see FIGS. 2, and 3A-3F, for example) were produced with laser cutting and photochemical machining as depicted in FIG. 2. Alternatively, the substrates 200 can be formed through laser machining, photolithography and etching, electroforming, machining, electro discharge machining, or 3D printing. An example prototype substrate 200 was made from 0.012" thick 17-4 stainless steel. The substrate 200 may include structural features 220, such as cutouts, narrowing of the substrate, or side or edgewise notches 222, for example, that are tailored or focused to concentrate strain on the sensing component 300, and/or structural features or orifices 240 for venting (discussed further herein below), with some of these alternative structural features 220, 240 being depicted in FIGS. 3A-3F. Other materials for the substrate 200 include weldable metals with high tensile strength including: stainless steel, titanium, beryllium copper. Additional materials could include ceramic or glass that has been metallized for brazing.

Sensing Component

A sensing component 300 such as a thin film strain sensor was created on the substrate 200 in a cleanroom environment under vacuum by means of sputter deposition and subsequent laser trimming to form the circuit of a Wheatstone bridge (see U.S. Pat. No. 10,359,325, noted herein above, for an example thin film strain sensor). In an embodiment, the sensing component 300 includes a number of signal terminals 310 and corresponding leadouts 320 equal to or greater than 2 and equal to or less than 12, alternatively equal to three signal terminals, further alternatively equal to four signal terminals, further alternatively equal to five signal channels, further alternatively equal to six signal channels, and further alternatively equal to eight signal channels for signal redundancy. Other sensor types could include: bonded foil strain sensors, optical strain sensors, capacitive sensors, or silicon sensors. The combination of the substrate 200, the stand-off 100, and the sensing component 300, is referred to as the weldable strain sensor 1000.

As noted herein above, the stand-off 100, substrate 200, sensing component 300, or any combination thereof, may also include at least one structural feature 240, such as an orifice, for venting the cavity 1100 (best seen with reference to FIGS. 3D and 3E). This venting feature 240 ensures that no trapped gases in the cavity 1100 during welding can cause errors in the measurements. In an alternative embodiment, this venting feature 240 may be eliminated so as to provide an enclosed structure. In another embodiment, the venting can take place by a feature in the instrumented component 2000 or the substrate 200.

Figure 3A:
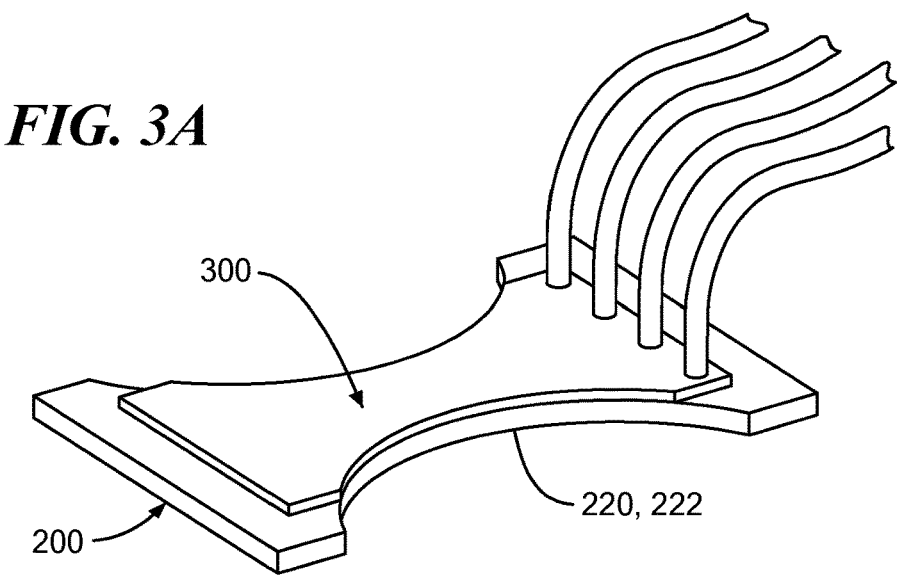
FIGS. 3A, 3B, 3C, 3D, 3E, and 3F, depict rotated isometric views of various example alternative substrate and sensing component configurations, in accordance with an embodiment.
Figure 3B:
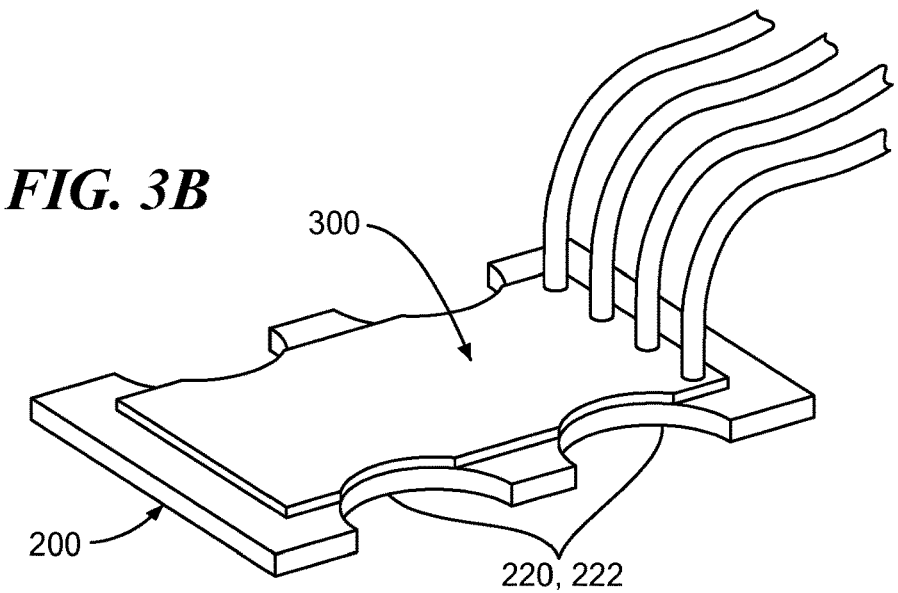
Figure 3C:
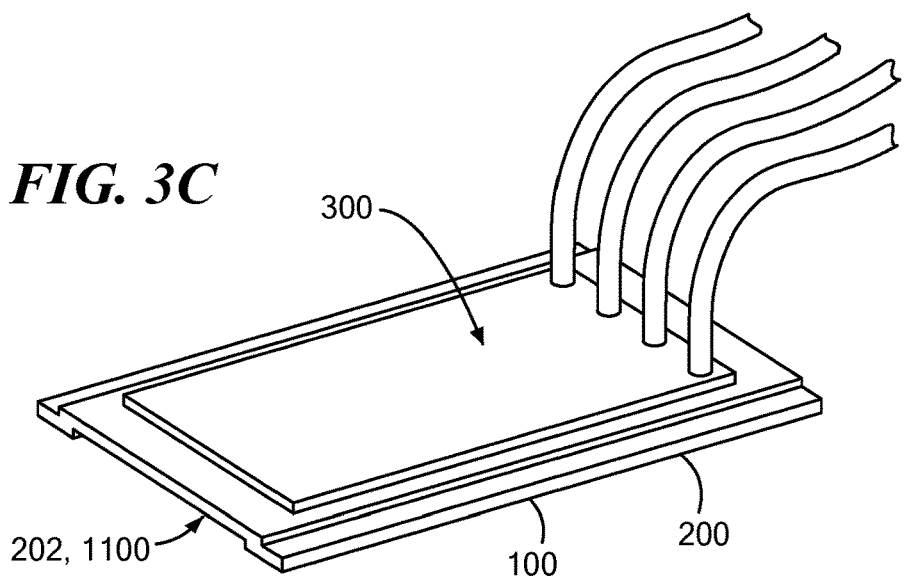
Figure 3D:
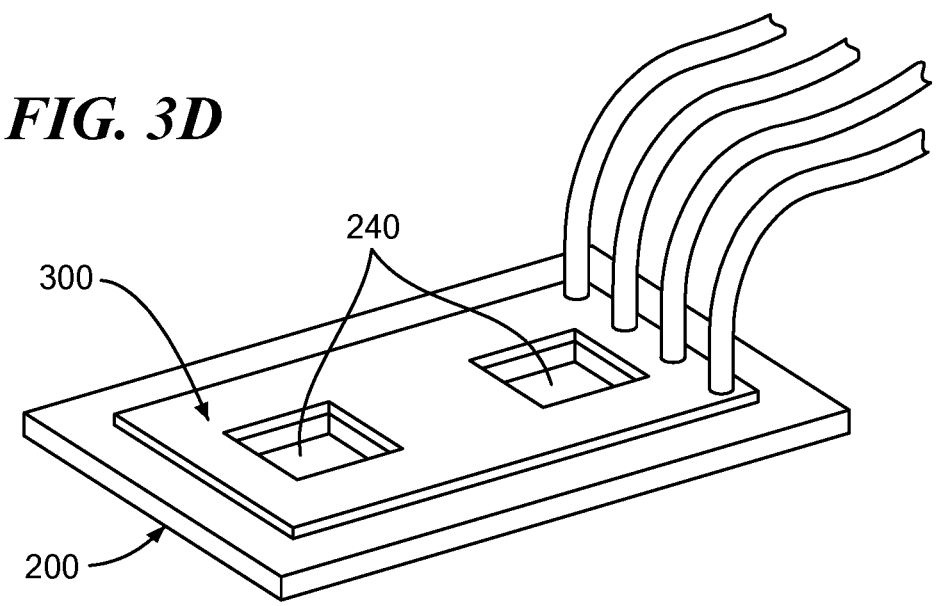
Figure 3E:
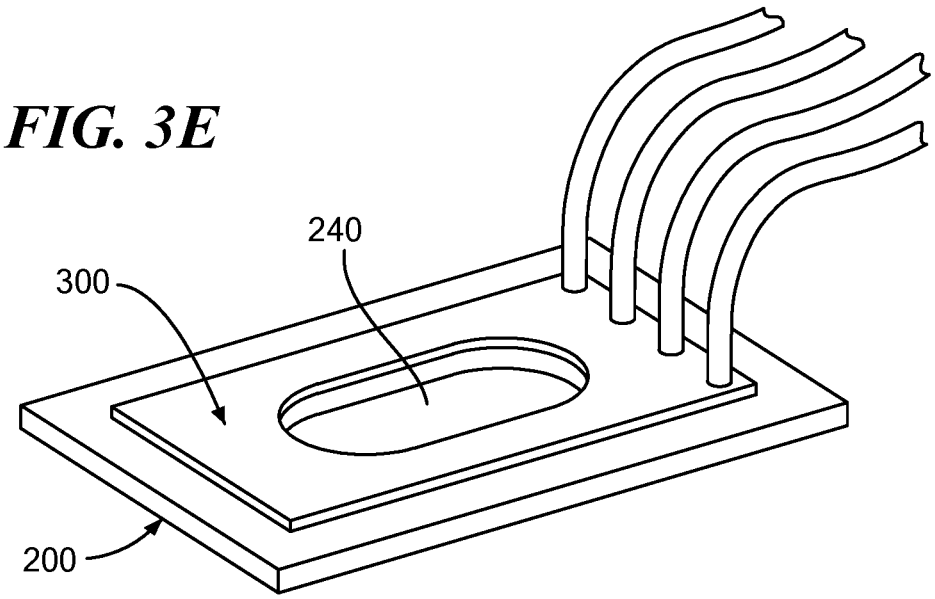
Figure 3F:
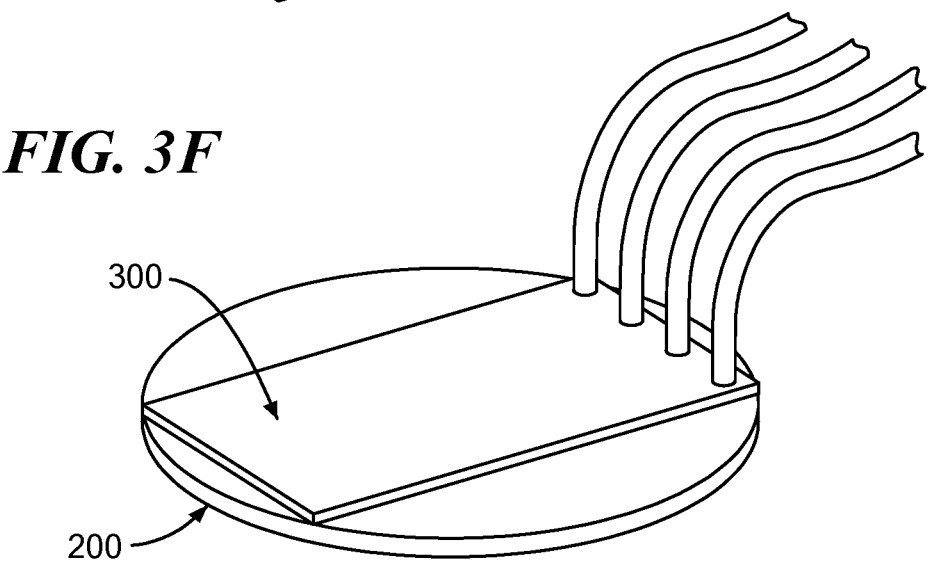

In an embodiment, the substrate 200 and the sensing component 300 have a similar 2D plan view outer shape, as depicted in FIG. 3C for example. Alternatively, the substrate 200 and the sensing component 300 have dissimilar 2D plan view outer shapes, as depicted in FIG. 3F for example.

In an embodiment, the sensing component 300 is configured to follow a same 2D bending mode as the underlying instrumented component 2000. Alternatively, the sensing component 300 is configured to follow a bending mode that is different from a bending mode of the underlying instrumented component 2000.

Instrumented Component

Figure 1E:
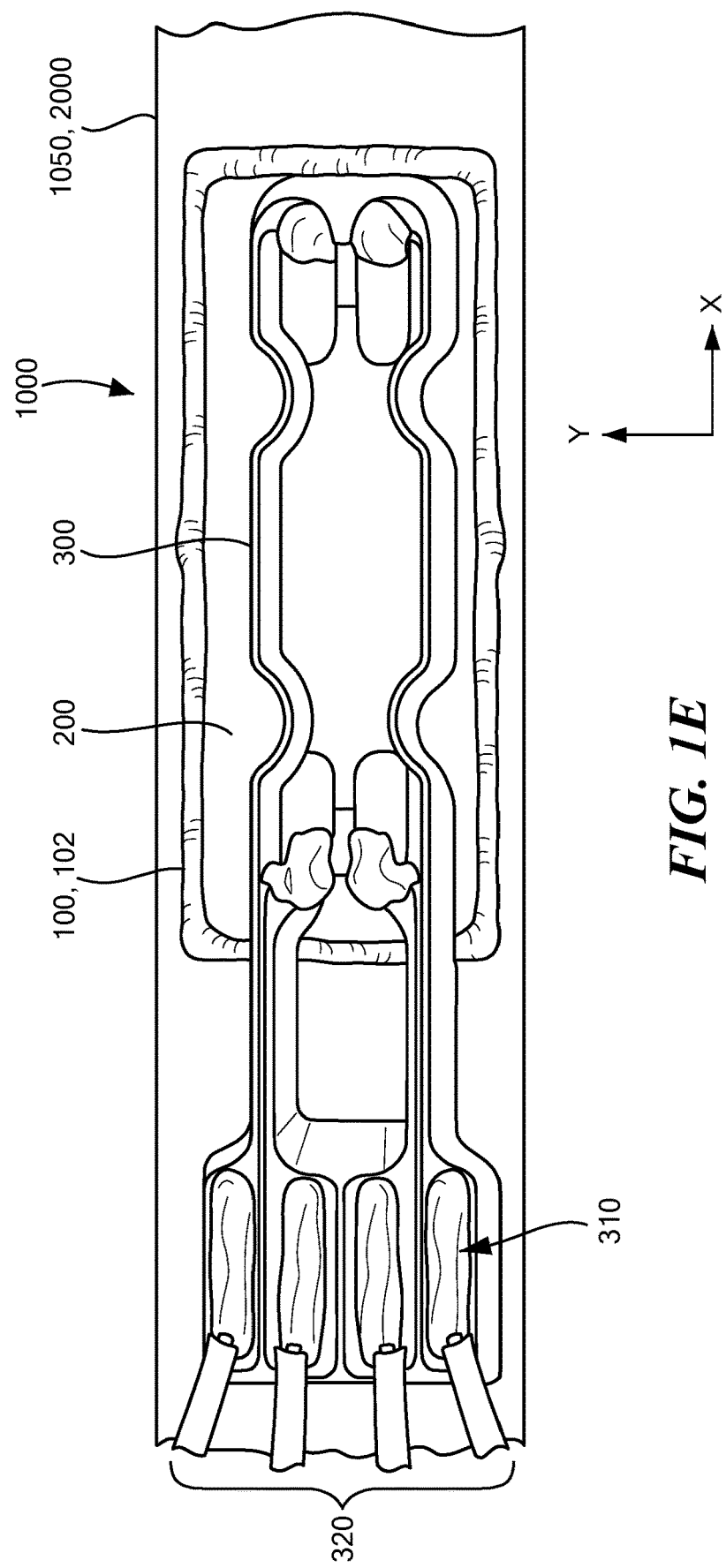
FIG. 1E depicts a top-down plan view of an example weldable strain sensor assembly similar to that of FIG. 1A and welded to an instrumented component, in accordance with an embodiment.

An example instrumented component 2000 (see FIGS. 1A-1E, 4A-4F for example) was a 17-4 stainless steel beam 1050 (best seen with reference to FIG. 1E). The weldable strain sensor 1000 was fixtured to the 17-4 stainless steel beam 1050 and laser welded at a 45 degree angle off planar around the entire perimeter of the weldable strain sensor 1000, as depicted in FIGS. 1B and 1E. The instrumented component 2000 may include features 220, 222 that concentrate strain (cut outs, notches, narrowing of component, etc.), as described herein above. Other types of joining could include: types of welding such as capacitive welding, laser welding, tig welding, mig welding, spot welding, seam welding, or friction welding.

During the course of Applicant's development work, it was discovered that the sensor performance improved as the instrumented component and substrate were more fully joined. While not being held to any particular theory, it is hypothesized that this improved performance was due to a reduction of friction and relative motion between the substrate 200 and instrumented component 2000. Applicant's data supports this hypothesis. The reduction of friction and relative motion between the substrate 200 and instrumented component 2000 is enabled by suspension of the substrate 200 and sensing component 300 off of the instrumented component 2000.

Weldable strain sensors have been known in the art, which typically uses spot welding to secure portions of a strain sensor flush to the substrate surface. This strain sensor typically includes sheet metal that is in contact with, but not fully joined to, the component surface, and is not suspended above the component surface, resulting in errors from friction. The spot-welding technique is used because it is inexpensive, field deployable, and equipment is readily available. The spot weld sends current from the top of the weldable sensor, whereas the method disclosed herein of laser welding at a 45-degree angle generates heat directly at the strain sensor/substrate interface. The weldable strain sensor 1000 as disclosed herein has the weld much closer to the sensing component to enhance sensor performance. Current joining methods with adhesives and epoxies may allow for complete joining of a substrate to the instrumented component, however, when exposed to humidity, temperature extremes, or chemicals, performance of the sensor can degrade.

Figure 6:
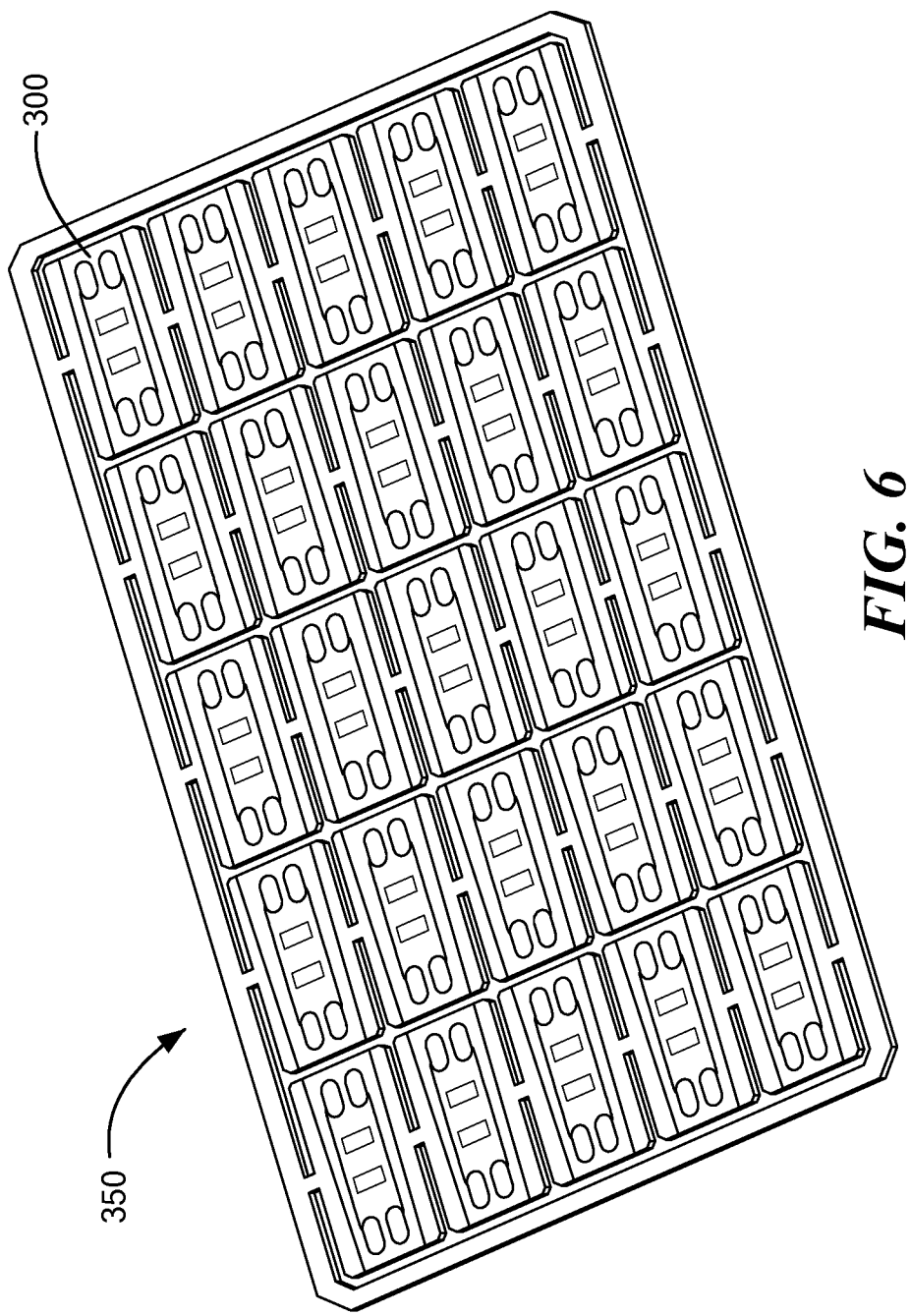
FIG. 6 depicts a top-down plan view of an example panel of weldable strain sensor assemblies, in accordance with an embodiment.

Contrary to existing strain sensors, the disclosed strain sensor 1000 includes a sensing component 300 in suspension (floating) over the instrumented component 2000 so as to eliminate friction between the sensing component 300 and/or substrate 200, and the instrumented component 2000. Example strain sensors 300 as disclosed herein were made in a batch process on panels 350 to enhance processability (best seen with reference to FIG. 6). The batch process was controlled to allow the weld to be in close proximity to active sensor surfaces. The contact point between the welded sensing component 300 and the underlying substrate 200 is fully or fixedly joined with a fully re-flowed, welded interface, that is absent relative planar movement between the sensing component 300 and the substrate 200. High temperature processing of the thin film weldable strain sensing element 300 during the manufacturing process ensures that the resulting strain sensors 1000 have already been subjected to temperatures above what they will see during welding to the instrumented component, which ensures that the welding process can induce only minimal or no changes in the electrical, thermal or mechanical properties, of the weldable strain sensor assembly as disclosed herein.

Figure 7:
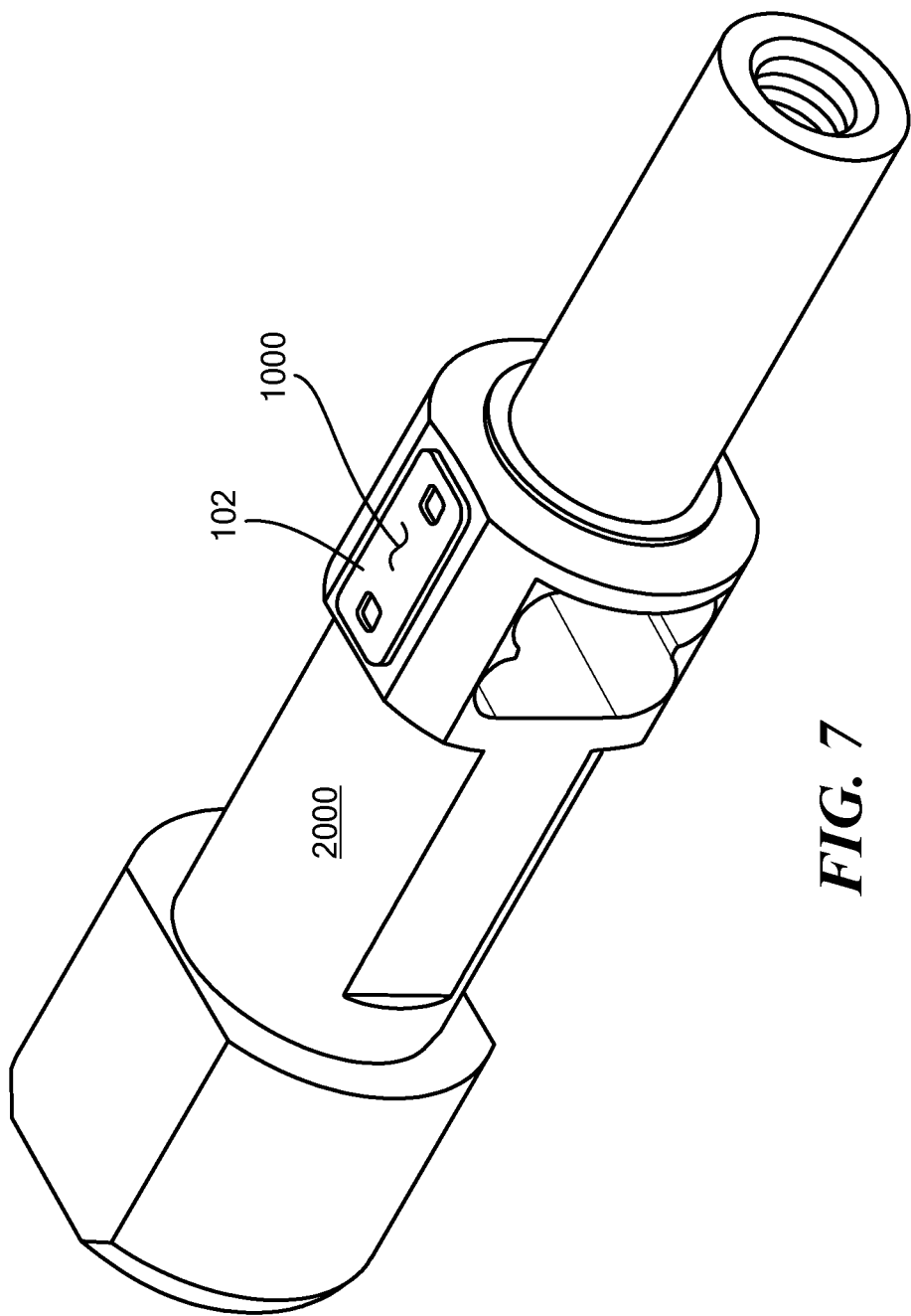
FIG. 7 depicts a rotated isometric view of an example weldable strain sensor assembly welded to an example instrumented component, in accordance with an embodiment.

To put the foregoing into context, reference is now made to FIG. 7, which depicts a rotated isometric view of an example weldable strain sensor assembly 1000 welded 102 to an example instrumented component 2000, but absent the electrical signal terminals 310 and leadouts 320 that are depicted in FIG. 1E. In an embodiment, the instrumented component 2000 may be part of an axle assembly for example, but may be any other component suitable for a purpose disclosed herein.

In view of all of the foregoing, it will be appreciated that various aspects of an embodiment are disclosed herein, which are in accordance with, but not limited to, at least the following aspects and/or combinations of aspects.

Aspect 1: A weldable strain sensor assembly 1000 configured to be joined to an instrumented component 2000, where the assembly 1000 includes: a stand-off 100; a substrate 200 disposed on top of the stand-off 100; and, a sensing component 300 disposed on a top or a bottom of the substrate 200; wherein the combination of the stand-off 100 and the substrate 200 are configured to suspend the sensing component 300 over the instrumented component 2000 with a defined gap 1100 between the instrumented component 2000 and the substrate 200 and/or the sensing component 300.

Aspect 2: The assembly 1000 of Aspect 1, wherein: the sensing component 300 has smaller x-y plan view dimensions than the substrate 200.

Aspect 3: The assembly 1000 of any of Aspects 1 to 2, wherein: the defined gap 1100 is equal to or greater than 0.0001 inches and equal to or less than 0.25 inches, alternatively is equal to or greater than 0.003 inches and equal to or less than 0.009 inches, or further alternatively is equal to about 0.006 inches.

Aspect 4: The assembly 1000 of any of Aspects 1 to 3, wherein: the sensing component 300 is configured to follow a same 2D bending mode as the underlying instrumented component 2000.

Aspect 5: The assembly 1000 of any of Aspects 1 to 3, wherein: the sensing component 300 is configured to follow a bending mode that is different from a bending mode of the underlying instrumented component 2000.

Aspect 6: The assembly 1000 of any of Aspects 1 to 5, wherein: the sensing component 300 is fixedly joined to the underlying substrate 200.

Aspect 7: The assembly 1000 of any of Aspects 1 to 6, wherein: the stand-off 100 is configured to be fixedly joined to the underlying instrumented component 2000.

Aspect 8: The assembly 1000 of any of Aspects 1 to 7, wherein: the stand-off 100 is configured to be at least edge bonded to the underlying instrumented component 2000.

Aspect 9: The assembly 1000 of any of Aspects 1 to 7, wherein: the stand-off 100 is configured to be welded 102 to the underlying instrumented component 2000.

Aspect 10: The assembly 1000 of any of Aspects 1 to 9, wherein: the stand-off 100 is configured to be welded 102 to the underlying instrumented component 2000 by a continuous weld 104.

Aspect 11: The assembly 1000 of any of Aspects 1 to 9, wherein: the stand-off 100 is configured to be welded 102 to the underlying instrumented component by an intermittent weld 106.

Aspect 12: The assembly 1000 of any of Aspects 1 to 11, wherein: the stand-off 100 is integrally formed with the substrate 200 to form a monolithic construct 130.

Aspect 13: The assembly 1000 of any of Aspects 1 to 12, wherein: the defined gap 1100 between the instrumented component 2000 and the substrate 200 is formed by a recess 202 in the substrate 200, and a peripheral underside rim 204 of the substrate 200 forms the stand-off 100.

Aspect 14: The assembly 1000 of any of Aspects 1 to 13, wherein: the stand-off 100 is a continuous uninterrupted projection 206 that extends upward from an upper support surface 2100 of the instrumented component 2000, or downward from an underside 208 of and is around an outer perimeter 210 of the substrate 200.

Aspect 15: The assembly 1000 of any of Aspects 1 to 13, wherein: the stand-off 100 includes a plurality of spaced-apart projections 216 that extend upward from an upper support surface 2100 of the instrumented component 2000, or downward from an underside 208 of and are around an outer perimeter 210 of the substrate 200.

Aspect 16: The assembly 1000 of any of Aspects 1 to 13, wherein: the stand-off 100 includes two or more projections 216 that extend upward from an upper support surface 2100 of the instrumented component 2000, or downward from an underside 208 of and provide distributed support of the substrate 200 and sensing component 300 relative to the instrumented component 2000.

Aspect 17: The assembly 1000 of any of Aspects 1 to 13, wherein: the stand-off 100 includes an outer rim 204 at an upper support surface 2100 of the instrumented component 2000, or an underside 208 of the substrate 200 that cooperates with a support surface 2100 of the instrumented component 2000, and that surrounds a central recess 2200 in the instrumented component 2000.

Aspect 18: The assembly 1000 of any of Aspects 1 to 17, wherein: the stand-off 100 further includes a sacrificial skirt 108 disposed on a bottom surface 110 of the stand-off 100, such that when the weldable strain sensor assembly 1000 is welded 102 to the instrumented component 2000, the sacrificial skirt 108 is first disposed in direct contact with the instrumented component 2000 and is then consumed or embedded, post-welding, into surrounding material of the stand-off 100 or the instrumented component 2000.

Aspect 19: The assembly 1000 of Aspect 18, wherein: the sacrificial skirt 108 is disposed proximate an outer perimeter 112 of the stand-off 100.

Aspect 20: The assembly 1000 of any of Aspects 18 to 19, wherein: the sacrificial skirt 108 is integrally formed with the stand-off 100.

Aspect 21: The assembly 1000 of any of Aspects 18 to 20, wherein: the sacrificial skirt 108 comprises a plurality of sacrificial nibs 114.

Aspect 22: The assembly 1000 of any of Aspects 1 to 21, wherein: the substrate 200 and the sensing component 300 have a similar 2D plan view outer shape.

Aspect 23: The assembly 1000 of any of Aspects 1 to 21, wherein: the substrate 200 and the sensing component 300 have dissimilar 2D plan view outer shapes.

Aspect 24: The assembly 1000 of any of Aspects 1 to 23, wherein: the substrate 200, the sensing component 300, or both the substrate 200 and the sensing component 300, have at least one structural feature 220 disposed and configured to tailor or focus a strain profile on the sensing component 300.

Aspect 25: The assembly 1000 of Aspect 24, wherein: the at least one structural feature 220 includes an edgewise notch 222.

Aspect 26: The assembly 1000 of any of Aspects 1 to 25, wherein: the stand-off 100, the substrate 200, the sensing component 300, or any combination of the stand-off 100, the substrate 200, and the sensing component 300, have at least one orifice 240 disposed and configured to allow venting of gases during a welding process when the weldable strain sensor assembly is welded 102 to the instrumented component 2000.

Aspect 27: The assembly 1000 of any of Aspects 1 to 26, wherein: the sensing component 300 includes a number of signal terminals 310 equal to or greater than 2 and equal to or less than 12, alternatively equal to three signal terminals, further alternatively equal to four signal terminals, further alternatively equal to five signal channels, further alternatively equal to six signal channels, and further alternatively equal to eight signal channels.

As used herein, the phrase "equal to about" is intended to account for manufacturing tolerances and/or insubstantial deviations from a nominal value that do not detract from a purpose disclosed herein and falling within a scope of the appended claims.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" or in "engagement with" another element, it can be directly on or engaged with the other element, or intervening elements may also be present. In contrast, when an element is referred to as being "directly on" or "directly engaged with" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The use of the terms "top", "bottom", "up", "down", "left", "right", "front", "back", etc. do not denote a limitation of structure, as the structure may be viewed from more than one orientation, but rather denote a relative structural relationship between one or more of the associated features. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. A weldable strain sensor assembly configured to be joined to an instrumented component, comprising:
   a stand-off;
   a substrate disposed on top of the stand-off; and
   a sensing component disposed on a top or a bottom of the substrate;
   wherein the combination of the stand-off and the substrate are configured to suspend the sensing component over the instrumented component with a defined gap between the instrumented component and at least one of: the substrate; and, the sensing component.

2. The assembly of claim 1, wherein:
   the sensing component has smaller x-y plan view dimensions than the substrate.

3. The assembly of claim 1, wherein:
the defined gap is equal to or greater than 0.0001 inches and equal to or less than 0.25 inches, alternatively is equal to or greater than 0.003 inches and equal to or less than 0.009 inches, or further alternatively is equal to about 0.006 inches.

4. The assembly of claim 1, wherein:
the sensing component is configured to follow a same 2D bending mode as the underlying instrumented component.

5. The assembly of claim 1, wherein:
the sensing component is configured to follow a bending mode that is different from a bending mode of the underlying instrumented component.

6. The assembly of claim 1, wherein:
the sensing component is fixedly joined to the underlying substrate.

7. The assembly of claim 1, wherein:
the stand-off is configured to be fixedly joined to the underlying instrumented component.

8. The assembly of claim 1, wherein:
the stand-off is configured to be at least edge bonded to the underlying instrumented component.

9. The assembly of claim 1, wherein:
the stand-off is configured to be welded to the underlying instrumented component.

10. The assembly of claim 1, wherein:
the stand-off is configured to be welded to the underlying instrumented component by a continuous weld.

11. The assembly of claim 1, wherein:
the stand-off is configured to be welded to the underlying instrumented component by an intermittent weld.

12. The assembly of claim 1, wherein:
the stand-off is integrally formed with the substrate to form a monolithic construct.

13. The assembly of claim 1, wherein:
the defined gap between the instrumented component and the substrate is formed by a recess in the substrate, and a peripheral underside rim of the substrate forms the stand-off.

14. The assembly of claim 1, wherein:
the stand-off is a continuous uninterrupted projection that extends upward from an upper support surface of the instrumented component, or downward from an underside of and is around an outer perimeter of the substrate.

15. The assembly of claim 1, wherein:
the stand-off comprises a plurality of spaced-apart projections that extend upward from an upper support surface of the instrumented component, or downward from an underside of and are around an outer perimeter of the substrate.

16. The assembly of claim 1, wherein:
the stand-off comprises two or more projections that extend upward from an upper support surface of the instrumented component, or downward from an underside of and provide distributed support of the substrate and sensing component relative to the instrumented component.

17. The assembly of claim 1, wherein:
the stand-off comprises an outer rim at an upper support surface of the instrumented component, or an underside of the substrate that cooperates with a support surface of the instrumented component, and that surrounds a central recess in the instrumented component.

18. The assembly of claim 1, wherein:
the stand-off further comprises a sacrificial skirt disposed on a bottom surface of the stand-off, such that when the weldable strain sensor assembly is welded to the instrumented component, the sacrificial skirt is disposed in direct contact with the instrumented component and is consumed or embedded, post-welding, into surrounding material of the stand-off or the instrumented component.

19. The assembly of claim 18, wherein:
the sacrificial skirt is disposed proximate an outer perimeter of the stand-off.

20. The assembly of claim 18, wherein:
the sacrificial skirt is integrally formed with the stand-off.

21. The assembly of claim 18, wherein:
the sacrificial skirt comprises a plurality of sacrificial nibs.

22. The assembly of claim 1, wherein:
the substrate and the sensing component have a similar 2D plan view outer shape.

23. The assembly of claim 1, wherein:
the substrate and the sensing component have dissimilar 2D plan view outer shapes.

24. The assembly of claim 1, wherein:
the substrate, the sensing component, or both the substrate and the sensing component, have at least one structural feature disposed and configured to tailor or focus a strain profile on the sensing component.

25. The assembly of claim 24, wherein:
the at least one structural feature comprises an edgewise notch.

26. The assembly of claim 1, wherein:
the stand-off, the substrate, the sensing component, or any combination of the stand-off, the substrate, and the sensing component, have at least one orifice disposed and configured to allow venting of gases during a welding process when the weldable strain sensor assembly is welded to the instrumented component.

27. The assembly of claim 1, wherein:
the sensing component comprises a number of signal terminals equal to or greater than 2 and equal to or less than 12, alternatively equal to three signal terminals, further alternatively equal to four signal terminals, further alternatively equal to five signal channels, further alternatively equal to six signal channels, and further alternatively equal to eight signal channels.

* * * * *